(12) United States Patent
McCracken, Jr. et al.

(10) Patent No.: US 9,949,304 B1
(45) Date of Patent: *Apr. 17, 2018

(54) MOBILE COMMUNICATION DEVICE PROFOUND IDENTITY BROKERING FRAMEWORK

(71) Applicant: Sprint Communications Company L.P., Overland Park, KS (US)

(72) Inventors: Billy Gene McCracken, Jr., Olathe, KS (US); Robert L. Spanel, Overland Park, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,934

(22) Filed: Nov. 30, 2016

Related U.S. Application Data

(63) Continuation of application No. 13/912,190, filed on Jun. 6, 2013, now Pat. No. 9,560,519.

(51) Int. Cl.
*H04W 8/18* (2009.01)
*H04W 76/02* (2009.01)
(Continued)

(52) U.S. Cl.
CPC ......... *H04W 76/021* (2013.01); *H04W 4/001* (2013.01); *H04W 12/06* (2013.01); *H04W 48/18* (2013.01); *H04W 4/005* (2013.01)

(58) Field of Classification Search
CPC ....... H04W 12/04; H04W 12/08; H04W 4/02; H04W 8/18
(Continued)

(56) References Cited

U.S. PATENT DOCUMENTS 5,303,378 A  4/1994 Cohen
5,321,735 A  6/1994 Breeden et al.
(Continued)

FOREIGN PATENT DOCUMENTS

EP  1933252 A1  6/2008
JP  6171245 B2  8/2017
(Continued)

OTHER PUBLICATIONS

Notice of Allowance dated Jul. 6, 2015, U.S. Appl. No. 13/844,145, filed Mar. 15, 2013.
(Continued)

*Primary Examiner* — Erica Navar

(57) ABSTRACT

A mobile communication device. The device comprises a cellular radio transceiver, a processor, and a memory integral with the device, wherein the memory is apportioned into a plurality of partitions. The device further comprises a first wireless communication identity stored in a first partition of the memory and a second wireless communication identity stored in a second partition of the memory, wherein the second wireless communication identity is different from the first wireless communication identity. The device further comprises an application stored in the memory that, when executed by the processor, detects a triggering event and in response to the triggering event selects one of the wireless communication identities to be an active communication identity of the device, wherein a wireless communication identity comprises a network access identity and a list of wireless communication systems to which the device is authorized to attach.

20 Claims, 7 Drawing Sheets

(51) Int. Cl.
*H04W 12/06* (2009.01)
*H04W 4/00* (2018.01)
*H04W 48/18* (2009.01)

(58) Field of Classification Search
USPC .................................................. 455/418–420
See application file for complete search history.

(56) References Cited

U.S. PATENT DOCUMENTS

| | | | |
|---|---|---|---|
| 5,764,889 A | 6/1998 | Ault et al. |
| 5,796,952 A | 8/1998 | Davis et al. |
| 5,825,876 A | 10/1998 | Peterson, Jr. |
| 6,131,024 A | 10/2000 | Boltz |
| 6,177,860 B1 | 1/2001 | Cromer et al. |
| 6,219,712 B1 | 4/2001 | Mann et al. |
| 6,222,463 B1 | 4/2001 | Rai |
| 6,363,150 B1 | 3/2002 | Bhagavath et al. |
| 6,389,403 B1 | 5/2002 | Dorak, Jr. |
| 6,434,561 B1 | 8/2002 | Durst, Jr. et al. |
| 6,477,180 B1 | 11/2002 | Aggarwal et al. |
| 6,507,869 B1 | 1/2003 | Franke et al. |
| 6,507,904 B1 | 1/2003 | Ellison et al. |
| 6,614,893 B1 | 9/2003 | Paiz |
| 6,651,171 B1 | 11/2003 | England et al. |
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,023,979 B1 | 4/2006 | Wu et al. |
| 7,043,241 B1 | 5/2006 | Sladek et al. |
| 7,069,234 B1 | 6/2006 | Cornelius et al. |
| 7,127,541 B2 | 10/2006 | Govindarajulu et al. |
| 7,366,806 B2 | 4/2008 | Milenkovic et al. |
| 7,386,275 B2 | 6/2008 | Pirzada et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,716,720 B1 | 5/2010 | Marek et al. |
| 7,761,558 B1 | 7/2010 | Jindal et al. |
| 7,849,309 B1 | 12/2010 | Brown |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,295,811 B1 | 10/2012 | Gailloux et al. |
| 8,298,295 B2 | 10/2012 | Aissi et al. |
| 8,316,237 B1 | 11/2012 | Felsher et al. |
| 8,332,895 B2 | 12/2012 | Nathan et al. |
| 8,332,953 B2 | 12/2012 | Lemieux et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,442,588 B2 | 5/2013 | Sims et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,498,572 B1 | 7/2013 | Schooley et al. |
| 8,504,097 B1 | 8/2013 | Cope et al. |
| 8,542,833 B2 | 9/2013 | Devol et al. |
| 8,566,183 B1 | 10/2013 | Bonar et al. |
| 8,588,749 B1 | 11/2013 | Sadhvani et al. |
| 8,590,012 B2 | 11/2013 | Roy et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,826,015 B2 | 9/2014 | Lakshminarayanan et al. |
| 8,831,998 B2 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,868,898 B1 | 10/2014 | Van Hoof |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,177,157 B2 | 11/2015 | Binder |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2 | 2/2016 | McCann et al. |
| 9,268,959 B2 | 2/2016 | Paczkowski et al. |
| 9,282,898 B2 | 3/2016 | McRoberts et al. |
| 9,324,016 B1 | 4/2016 | Cordes et al. |
| 9,374,363 B1 | 6/2016 | Paczkowski et al. |
| 9,384,498 B1 | 7/2016 | Bertz et al. |
| 9,443,088 B1 | 9/2016 | Bye et al. |
| 9,454,723 B1 | 9/2016 | Cordes et al. |
| 9,473,945 B1 | 10/2016 | Marquardt et al. |
| 9,560,519 B1 | 1/2017 | McCracken, Jr. et al. |
| 9,613,208 B1 | 4/2017 | Paczkowski et al. |
| 9,712,999 B1 | 7/2017 | Cordes et al. |
| 9,779,232 B1 | 10/2017 | Paczkowski et al. |
| 9,811,672 B2 | 11/2017 | Bye et al. |
| 9,817,992 B1 | 11/2017 | Paczkowski et al. |
| 9,819,679 B1 | 11/2017 | Bertz et al. |
| 9,838,868 B1 | 12/2017 | Nelson et al. |
| 9,838,869 B1 | 12/2017 | Bye et al. |
| 2001/0041591 A1 | 11/2001 | Carroll |
| 2002/0002468 A1 | 1/2002 | Spagna et al. |
| 2002/0007456 A1 | 1/2002 | Peinado et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |

(56) References Cited

U.S. PATENT DOCUMENTS

| | | |
|---|---|---|
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0092435 A1 | 5/2003 | Boivin |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0182347 A1 | 9/2003 | Dehlinger |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0036572 A1 | 2/2004 | Forster |
| 2004/0043788 A1 | 3/2004 | Mittal |
| 2004/0064351 A1 | 4/2004 | Mikurak |
| 2004/0093274 A1 | 5/2004 | Vanska et al. |
| 2004/0137890 A1 | 7/2004 | Kalke |
| 2004/0158840 A1 | 8/2004 | Rothman et al. |
| 2004/0202319 A1 | 10/2004 | Hussain et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1 | 5/2005 | Smith et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1 | 7/2005 | Milenkovic et al. |
| 2005/0153741 A1 | 7/2005 | Chen et al. |
| 2005/0164680 A1 | 7/2005 | Gould |
| 2005/0181796 A1 | 8/2005 | Kumar et al. |
| 2005/0200478 A1 | 9/2005 | Koch et al. |
| 2005/0226468 A1 | 10/2005 | Deshpande et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1 | 11/2005 | Melick et al. |
| 2005/0272445 A1 | 12/2005 | Zellner |
| 2005/0280557 A1 | 12/2005 | Jha et al. |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1 | 7/2006 | Cardina et al. |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0239131 A1 | 10/2006 | Nathan et al. |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bemardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0156850 A1 | 7/2007 | Corrion |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri |
| 2007/0188306 A1 | 8/2007 | Tethrake et al. |
| 2007/0192652 A1 | 8/2007 | Kao et al. |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1 | 1/2008 | Giordano et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0068166 A1 | 3/2008 | Lauper et al. |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1 | 5/2008 | Jatschka et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2008/0281953 A1 | 11/2008 | Blaisdell |
| 2008/0304640 A1 | 12/2008 | Reilly |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1 | 5/2009 | Gangi |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |

(56) References Cited

U.S. PATENT DOCUMENTS

| | | |
|---|---|---|
| 2009/0215385 A1 | 8/2009 | Waters et al. |
| 2009/0224919 A1 | 9/2009 | Angell et al. |
| 2009/0227290 A1 | 9/2009 | Chien |
| 2009/0248445 A1 | 10/2009 | Harnick |
| 2009/0271321 A1 | 10/2009 | Stafford |
| 2009/0275364 A1 | 11/2009 | Morel et al. |
| 2009/0281947 A1 | 11/2009 | Erel |
| 2009/0289764 A1 | 11/2009 | Chiu |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1 | 12/2009 | Wall et al. |
| 2010/0031325 A1 | 2/2010 | Maigne et al. |
| 2010/0052844 A1 | 3/2010 | Wesby |
| 2010/0064341 A1 | 3/2010 | Aldera |
| 2010/0066486 A1 | 3/2010 | Park et al. |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0121156 A1 | 5/2010 | Yoo |
| 2010/0125512 A1 | 5/2010 | Jones et al. |
| 2010/0125904 A1 | 5/2010 | Nice et al. |
| 2010/0127868 A1 | 5/2010 | Hamilton et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153513 A1 | 6/2010 | Zahran |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1* | 6/2011 | Dadu ............... H04L 63/0853 455/411 |
| 2011/0154032 A1 | 6/2011 | Mauro |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1 | 9/2011 | Rutigliano et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258443 A1 | 10/2011 | Barry |
| 2011/0258462 A1 | 10/2011 | Robertson et al. |
| 2011/0269456 A1* | 11/2011 | Krishnaswamy ....... H04W 8/26 455/426.1 |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0108295 A1 | 5/2012 | Schell et al. |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0166806 A1 | 6/2012 | Zhang et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1 | 8/2012 | Arponen et al. |
| 2012/0220269 A1 | 8/2012 | Feng |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0274444 A1 | 11/2012 | Micali et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |

(56) References Cited

U.S. PATENT DOCUMENTS

| | | |
|---|---|---|
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1 | 1/2013 | Dinan |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0086695 A1 | 4/2013 | Lakshminarayanan |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1* | 9/2013 | Jonas .............. H04W 8/22 455/418 |
| 2013/0260791 A1 | 10/2013 | Malinovskiy et al. |
| 2013/0262264 A1 | 10/2013 | Karstoft |
| 2013/0263212 A1 | 10/2013 | Faltyn et al. |
| 2013/0290359 A1 | 10/2013 | Eronen et al. |
| 2013/0290709 A1 | 10/2013 | Muppidi et al. |
| 2013/0310003 A1 | 11/2013 | Sadhvani et al. |
| 2013/0313314 A1 | 11/2013 | Jeng et al. |
| 2013/0331067 A1* | 12/2013 | Coussemaeker ....... G06Q 10/10 455/412.2 |
| 2013/0332456 A1 | 12/2013 | Arkin |
| 2013/0343181 A1 | 12/2013 | Stroud et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0052562 A1 | 2/2014 | Oliveira et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0143826 A1 | 5/2014 | Sharp et al. |
| 2014/0155025 A1 | 6/2014 | Parker et al. |
| 2014/0166745 A1 | 6/2014 | Graef et al. |
| 2014/0173747 A1 | 6/2014 | Govindaraju |
| 2014/0188412 A1* | 7/2014 | Mahajan ............... G06F 1/3206 702/63 |
| 2014/0188738 A1 | 7/2014 | Huxham |
| 2014/0200051 A1 | 7/2014 | Liu |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1 | 9/2014 | Lynam et al. |
| 2014/0279556 A1 | 9/2014 | Priebatsch et al. |
| 2014/0279558 A1 | 9/2014 | Kadi et al. |
| 2014/0298026 A1 | 10/2014 | Isozaki et al. |
| 2015/0032976 A1 | 1/2015 | Chapier et al. |
| 2015/0106805 A1 | 4/2015 | Melander et al. |
| 2015/0172928 A1 | 6/2015 | Katzer et al. |
| 2015/0358455 A1 | 12/2015 | Mosher et al. |
| 2016/0004876 A1 | 1/2016 | Bye et al. |
| 2016/0142396 A1 | 5/2016 | McRoberts et al. |
| 2017/0026840 A1 | 1/2017 | Eyal |

FOREIGN PATENT DOCUMENTS

| | | |
|---|---|---|
| WO | WO2011025433 A1 | 3/2011 |
| WO | WO2012064171 A1 | 5/2012 |
| WO | WO2012085593 A1 | 6/2012 |
| WO | WO2013170228 A2 | 11/2013 |
| WO | WO2014004590 A2 | 1/2014 |
| WO | WO2014018575 A2 | 1/2014 |
| WO | WO2014025687 A2 | 2/2014 |
| WO | WO2014158431 A1 | 10/2014 |

OTHER PUBLICATIONS

FAIPP Pre-Interview Communication dated Mar. 1, 2016, U.S. Appl. No. 13/863,376, filed Apr. 15, 2013.
Notice of Allowance dated May 2, 2016, U.S. Appl. No. 13/863,376, filed Apr. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Feb. 12, 2015, U.S. Appl. No. 14/066,661, filed Oct. 29, 2013.
Notice of Allowance dated Jul. 6, 2015, U.S. Appl. No. 14/066,661, filed Oct. 29, 2013.
Restriction Requirement dated Aug. 14, 2014, U.S. Appl. No. 13/594,777, filed Aug. 25, 2012.
Notice of Allowance dated Dec. 3, 2014, U.S. Appl. No. 13/594,777, filed Aug. 25, 2012.
Notice of Allowance dated Nov. 9, 2015, U.S. Appl. No. 14/659,614, filed Mar. 17, 2015.
FAIPP Pre-Interview Communication dated Nov. 12, 2014, U.S. Appl. No. 13/844,145, filed Mar. 15, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
Final Office Action dated Aug. 27, 2015, U.S. Appl. No. 13/802,404, filed Mar. 13, 2013.
Advisory Action dated Nov. 16, 2015, U.S. Appl. No. 13/802,404, filed Mar. 13, 2013.
Office Action dated May 17, 2016, U.S. Appl. No. 13/802,404, filed Mar. 13, 2013.
Notice of Allowance dated Nov. 18, 2016, U.S. Appl. No. 13/802,404, filed Mar. 13, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
FAIPP Pre-Interview Communication dated Mar. 26, 2015, U.S. Appl. No. 13/939,175, filed Jul. 10, 2013.
Notice of Allowance dated Jul. 7, 2015, U.S. Appl. No. 13/939,175, filed Jul. 10, 2013.

(56) References Cited

OTHER PUBLICATIONS

FAIPP Pre-Interview Communication dated Oct. 29, 2014, U.S. Appl. No. 13/844,282, filed Mar. 15, 2013.
Final Office Action dated Mar. 24, 2015, U.S. Appl. No. 13/844,282, filed Mar. 15, 2013.
FAIPP Pre-Interview Communication dated Jul. 17, 2014, U.S. Appl. No. 13/594,778, filed Aug. 25, 2012.
Notice of Allowance dated Sep. 19, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
First Action Interview Office Action dated Dec. 3, 2014, U.S. Appl. No. 13/594,779, filed Aug. 25, 2012.
Notice of Allowance dated Aug. 14, 2015, U.S. Appl. No. 13/594,779, filed Aug. 25, 2012.
Office Action dated May 5, 2014, U.S. Appl. No. 13/786,450, filed Mar. 5, 2013.
Final Office Action dated Nov. 7, 2014, U.S. Appl. No. 13/786,450, filed Mar. 5, 2013.
Notice of Allowance dated Feb. 26, 2015, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Mar. 11, 2016, U.S. Appl. No. 13/912,190, filed Jun. 6, 2013.
Notice of Allowance dated Aug. 24, 2016, U.S. Appl. No. 13/912,190, filed Jun. 6, 2013.
FAIPP Pre-Interview Communication dated Apr. 15, 2015, U.S. Appl. No. 14/085,474, filed Nov. 20, 2013.
Notice of Allowance dated May 29, 2015, U.S. Appl. No. 14/085,474, filed Nov. 20, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Feb. 26, 2016, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Notice of Allowance dated Dec. 19, 2014, U.S. Appl. No. 13/844,325, filed Mar. 15, 2013.
Notice of Allowance dated Jan. 2, 2015, Application U.S. Appl. No. 13/831,463, filed Mar. 14, 2013.
European Examination Report dated Jun. 1, 2016, EPC Application Serial No. 14775613.4, filed on Jul. 8, 2015.
FAIPP Pre-Interview Communication dated Mar. 24, 2015, U.S. Appl. No. 13/964,112, filed Aug. 12, 2013.
Notice of Allowance dated Aug. 3, 2015, U.S. Appl. No. 13/964,112, filed Aug. 12, 2013.
Office Action dated Aug. 25, 2016, U.S. Appl. No. 13/860,338, filed Apr. 10, 2013.
Restriction Requirement dated Jan. 12, 2016, U.S. Appl. No. 13/912,190, filed Jun. 6, 2013.
Notice of Allowance dated Jul. 6, 2017, U.S. Appl. No. 14/855,364, filed Sep. 15, 2015.
Japanese Decision for Grant dated Jun. 6, 2017, JP Application Serial No. 2015-524404.
Advisory Action dated Jun. 1, 2017, U.S. Appl. No. 13/860,338, filed Apr. 10, 2013.
FAIPP Pre-Interview Communication dated Apr. 27, 2017, U.S. Appl. No. 14/606,011, filed Jan. 26, 2015.
Notice of Allowance dated May 30, 2017, U.S. Appl. No. 14/596,218, filed Jan. 14, 2015.
FAIPP Pre-Interview Communication dated May 9, 2017, U.S. Appl. No. 14/853,492, filed Sep. 14, 2015.
Notice of Allowance dated Jul. 7, 2017, U.S. Appl. No. 14/853,492, filed Sep. 14, 2015.
Notice of Allowance dated Jul. 24, 2017, U.S. Appl. No. 14/947,257, filed Nov. 20, 2015.
Twin Connect—"User Guide for Windows"; 30 pages; dated 2013. (53400 FAIPC).
WiseGEEK,"What is a USB Dongle?," http://www.wisegeek.com/what-is-a-usb-dongle.htm, four pages, dated Jul. 25, 2017. (53400 FAIPC).
Bertz, Lyle T., et al., "Hardware Assisted Provenance Proof of Named Data Networking Associated to Device Data, Addresses, Services, and Servers," filed Sep. 14, 2015, U.S. Appl. No. 14/853,492.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Mar. 25, 2015, U.S. Appl. No. 13/532,588, filed Jun. 25, 2012.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.
FAIPP Pre-Interview Communication dated Sep. 25, 2014, U.S. Appl. No. 13/533,969, filed Jun. 27, 2012.
Notice of Allowance dated Feb. 5, 2015, U.S. Appl. No. 13/533,969, filed Jun. 27, 2012.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Office Action dated Dec. 15, 2014, U.S. Appl. No. 13/571,348, filed Aug. 10, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
Office Action dated Aug. 29, 2014, U.S. Appl. No. 13/470,203, filed May 11, 2012.
Notice of Allowance dated Dec. 22, 2014, U.S. Appl. No. 13/470,203, filed May 11, 2012.
FAIPP Pre-Interview Communication dated Jul. 2, 2015, U.S. Appl. No. 14/632,850, filed Feb. 26, 2015.
Final Office Action dated Nov. 6, 2015, U.S. Appl. No. 14/632,850, filed Feb. 26, 2015.
Advisory Action dated Jan. 29, 2016, U.S. Appl. No. 14/632,850, filed Feb. 26, 2015.
Examine's Answer dated Nov. 16, 2016, U.S. Appl. No. 14/632,850, filed Feb. 26, 2015.
FAIPP Pre-Interview Communication dated May 12, 2014, U.S. Appl. No. 13/294,177, filed Nov. 11, 2011.

(56) References Cited

OTHER PUBLICATIONS

Notice of Allowance dated Oct. 8, 2014, U.S. Appl. No. 13/294,177, filed Nov. 11, 2011.
Notice of Allowance dated Jun. 17, 2015, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Mar. 10, 2015, U.S. Appl. No. 13/762,319, filed Feb. 7, 2013.
Notice of Allowance dated Jun. 9, 2015, U.S. Appl. No. 13/762,319, filed Feb. 7, 2013.
Notice of Allowance dated Aug. 30, 2013, U.S. Appl. No. 13/540,437, filed Jul. 2, 2012.
FAIPP Pre-Interview Communication dated May 21, 2015, U.S. Appl. No. 14/090,667, filed Nov. 26, 2013.
Notice of Allowance dated Aug. 4, 2015, U.S. Appl. No. 14/090,667, filed Nov. 26, 2013.
Restriction Requirement dated Nov. 1, 2013, U.S. Appl. No. 13/557,213 filed Jul. 25, 2012.
Office Action dated Dec. 19, 2013, U.S. Appl. No. 13/557,213 filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance dated Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
Notice of Allowance dated Sep. 21, 2015, U.S. Appl. No. 14/148,714, filed Jan. 6, 2014.
European Examination Report dated Mar. 3, 2016, EPC Application Serial No. 13822974.5, filed on Jan. 8, 2015.
FAIPP Pre-Interview Communication dated Aug. 4, 2014, U.S. Appl. No. 13/844,357, filed Mar. 15, 2013.
Notice of Allowance dated Oct. 6, 2014, U.S. Appl. No. 13/844,357, filed Mar. 15, 2013.
FAIPP Pre-Interview Communication dated Mar. 21, 2017, U.S. Appl. No. 14/855,364, filed Sep. 15, 2015.
European Examination Report dated Feb. 14, 2017, EPC Application Serial No. 14775613.4, filed on Jul. 8, 2015.
sinal Office Action dated Mar. 9, 2017, U.S. Appl. No. 13/860,338, filed Apr. 10, 2013.
FAIPP Office Action dated Apr. 5, 2017, U.S. Appl. No. 14/596,218, filed Jan. 14, 2015.
Office Action dated Mar. 8, 2017, U.S. Appl. No. 14/947,257, filed Nov. 20, 2015.
Notice of Allowance dated Mar. 10, 2017, U.S. Appl. No. 15/069,921, filed Mar. 14, 2016.
Paczkowski, Lyle W., et al., "System and Method for Secure USIM Wireless Network Access," filed Nov. 20, 2015, U.S. Appl. No. 14/947,257.
Bye, Stephen James, et al., "Delivering Digital Content to a Mobile Device via a Digital Rights Clearing House", filed Apr. 10, 2013, U.S. Appl. No. 13/860,338.
McCracken, Billy Gene, Jr., et al. "Mobile Communication Device Profound Identity Brokering Framework", filed Jun. 6, 2013, U.S. Appl. No. 13/912,190.
Neson, Tracy L., et al., "Mated Universal Serial Bus (USB) Wireless Dangles Configured with Destination Addresses," filed Jan. 26, 2015, U.S. Appl. No. 14/606,011.
Paczkowski, Lyle W., et al., "Trusted Code Generation and Verification to Prevent Fraud from Maleficent External Devices that Capture Data," filed Jan. 14, 2015, U.S. Appl. No. 14/596,218.

Cordes, Kevin R., et al., "Digest of Biographical Information for an Electronic Device with Static and Dynamic Portions," filed Mar. 14, 2016, U.S. Appl. No. 15/069,921.
FAIPP Pre-Interview Communication dated Feb. 4, 2015, U.S. Appl. No. 14/075,663, filed Nov. 8, 2013.
First Action Interview Office Action dated Apr. 10, 2015, U.S. Appl. No. 14/075,663, filed Nov. 8, 2013.
Notice of Allowance dated Jul. 1, 2015, U.S. Appl. No. 14/075,663, filed Nov. 8, 2013.
FAIPP Pre-Interview Communication dated Feb. 24, 2015, U.S. Appl. No. 14/163,047, filed Jan. 24, 2014.
Notice of Allowance dated Apr. 9, 2015, U.S. Appl. No. 14/163,047, filed Jan. 24, 2014.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Aug. 8, 2016, U.S. Appl. No. 14/596,218, filed Jan. 14, 2015.
FAIPP Pre-Interview Communication dated Nov. 18, 2015, U.S. Appl. No. 14/681,077, filed Apr. 7, 2015.
First Action Interview Office Action dated Mar. 28, 2016, U.S. Appl. No. 14/681,077, filed Apr. 7, 2015.
Notice of Allowance dated Jun. 15, 2016, U.S. Appl. No. 14/681,077, filed Apr. 7, 2015.
FAIPP Pre-Interview Communication dated Aug. 5, 2015, U.S. Appl. No. 13/857,141, filed Apr. 4, 2013.
Notice of Allowance dated Dec. 17, 2015, U.S. Appl. No. 13/857,141, filed Apr. 4, 2013.
FAIPP Pre-Interview Communication dated Oct. 5, 2016, U.S. Appl. No. 15/069,921, filed Mar. 14, 2016.
Restriction Requirement dated Jan. 5, 2015, U.S. Appl. No. 13/857,139, filed Apr. 4, 2013.
FAIPP Pre-Interview Communication dated Jun. 2, 2015, U.S. Appl. No. 13/857,139, filed Apr. 4, 2013.
Office Action dated Nov. 19, 2015, U.S. Appl. No. 13/857,139, filed Apr. 4, 2013.
Notice of Allowance dated May 26, 2016, U.S. Appl. No. 13/857,139, filed Apr. 4, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Notice of Allowance dated Jun. 11, 2015, U.S. Appl. No. 13/857,138, filed Apr. 4, 2013.
FAIPP Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Foreign Communication from a Related Counterpart—International Preliminary Report on Patentability, dated Nov. 20, 2014, PCT/US13/40673, filed on May 10, 2013.

(56) References Cited

OTHER PUBLICATIONS

Giesecke & Devrient, "The OTA Platform in the World of LTE", Jan. 2011, http://www.gi-de.com/gd_media/media/en/documents/brochures/mobile_security_2/cste_1/OTA-and-LTE.pdf.

Pesonen, Lauri, "Development of Mobile Payment Ecosystem—NFC Based Payment Services", Aug. 27, 2008.

Foreign Communication from a Related Counterpart—International Search Report and Written Opinion, dated Feb. 4, 2014, PCT/US13/47729, filed on Jun. 25, 2013.

Foreign Communication from a Related Counterpart—International Preliminary Report on Patentability, dated Jan. 3, 2015, PCT/US13/47729, filed on Jun. 25, 2013.

Foreign Communication from a Related Counterpart—International Search Report and Written Opinion, dated Apr. 22, 2014, PCT/US13/53617, filed on Aug. 5, 2013.

Foreign Communication from a Related Counterpart—International Preliminary Report on Patentability, dated Feb. 19, 2015, PCT/US13/53617, filed on Aug. 5, 2013.

Foreign Communication from a Related Counterpart—International Search Report and Written Opinion, dated Feb. 4, 2014, PCT/US13/51750, filed on Jul. 24, 2013.

Foreign Communication from a Related Counterpart—International Preliminary Report on Patentability, dated Feb. 5, 2015, PCT/US13/51750, filed on Jul. 24, 2013.

Foreign Communication from a Related Counterpart—International Search Report and Written Opinion, dated Jul. 11, 2014, PCT/US14/16651, filed on Feb. 16, 2014.

Foreign Communication from a Related Counterpart—International Preliminary Report on Patentability, dated Sep. 24, 2015, PCT/US14/16651, filed on Feb. 16, 2014.

Ahmed, Farid, et al., "Correlation-based Watermarking Method for Imagine Authentication Applications", Society of Photo-Optical Instrumentation Engineers, Feb. 17, 2004, pp. 1834-1838.

Perrig, Adrian, et al., "SPINS: Security Protocols for Sensor Networks," ACM, Sep. 2002, vol. 8, pp. 521-534.

Lark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.

Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber=1617569.

Henderson, Tristan, et al., "On the Wire, Congestion Pricing: Paying Your Way in Communications Networks," University College London, Sep./Oct. 2001, retrieved from: http://tristan.host.cs.st-andrews.ac.uklresearch/pubs/ieeeic01.pdf.

Dietrich, Kurt, et al., "Implementation Aspects of Mobile and Embedded Trusted Computing," Institute for Applied Information Processing and Communications, Trusted Computing Interaction Conference, 2009.

Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003.

Hamdare, Safa, et al., "Securing SMS Based One Time Password Technique from Man in the Middle Attach," IJETT, vol. 11 Issue 3, May 2014.

Daczkowski, Lyle W., et al., "Trusted Security Zone Enhanced with Trusted Hardware Drivers," filed Mar. 13, 2013, U.S. Appl. No. 13/802,404.

Decision on Appeal dated Sep. 15, 2017, U.S. Appl. No. 14/632,850, filed Feb. 26, 2015.

European Examination Report dated Sep. 20, 2017, EPC Application Serial No. 14775613.4, filed on Jul. 8, 2015.

Notice of Allowance dated Jul. 28, 2017, U.S. Appl. 13/860,338, filed Apr. 10, 2013.

Notice of Allowance dated Aug. 7, 2017, U.S. Appl. No. 14/606,011, filed Jan. 26, 2015.

Paczkowski, Lyle W., et al., "System and Method for Secure USIM Wireless Network Access," filed Sep. 29, 2017, U.S. Appl. No. 15/719,813.

Marquardt, Ronald R., et al., "Data Link Layer Trust Signaling in Communication Network," filed Jul. 11, 2017, U.S. Appl. No. 15/646,842.

Notice of Allowance dated Oct. 18, 2017, U.S. Appl. No. 14/632,850, filed Feb. 26, 2015.

\* cited by examiner

MOBILE COMMUNICATION DEVICE PROFOUND IDENTITY BROKERING FRAMEWORK

CROSS-REFERENCE TO RELATED APPLICATIONS

This application is a continuation of and claims priority under 35 U.S.C. § 120 to U.S. patent application Ser. No. 13/912,190, filed Jun. 6, 2013, entitled "Mobile Communication Device," by Billy Gene McCracken, Jr., et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be configured for operating in different ways or in different network conditions by storing settings or values or files in the device. Some of the stored settings may be one or more kinds of roaming lists, e.g., a priority ordered list of wireless systems to select and attempt to attach a wireless link to. Mobile communication devices may be used by a user as a business device, for example in support of his role as an employee of a corporation, as a personal communication device, for example in support of his role as a private individual. Mobile communication devices may be configured or provisioned to perform machine-to-machine communication transactions, for example by a radio communication session between the mobile communication device and a door scanner such as to gain access to an office building or to a hotel room.

SUMMARY

In an embodiment, a method of establishing a wireless communication link by a mobile communication device is disclosed. The method comprises storing a first wireless communication identity in a first partition of a memory of the mobile communication device, wherein the first wireless communication identity comprises a first network access identity associated with a first country, a first list of wireless communication systems to which the device is authorized to attach, a first rule set for prioritizing among the wireless communication systems identified in the first list, and a table of device rules. The method further comprises storing a second wireless communication identity in a second partition of the memory, wherein the second wireless communication identity comprises a second network access identity associated with a second country, a second list of wireless communication systems to which the device is authorized to attach, a second rule set for prioritizing among the wireless communication systems identified in the second list, and a table of device rules, wherein at least the first network access identity is different from the second network access identity, wherein only a single wireless communication identity is active on the device at one time, and wherein the device establishes a wireless communication link based on an active wireless communication identity. The method further comprises determining a country in which the device is located and, based on the country, one of deactivating the first wireless communication identity and activating the second wireless communication identity or deactivating the second wireless communication identity and activating the first wireless communication identity.

In another embodiment, a mobile communication device is disclosed. The mobile communication device comprises a cellular radio transceiver, a processor, and a non-transitory memory integral with the mobile communication device, wherein the memory is apportioned into a plurality of partitions. The device further comprises a first wireless communication identity stored in a first partition of the memory, wherein a wireless communication identity comprises a network access identity, a list of wireless communication systems to which the device is authorized to attach, a rule set for prioritizing among the wireless communication systems identified in the list, and a table of device rules. The device further comprises a second wireless communication identity stored in a second partition of the memory, wherein the second wireless communication identity is different from the first wireless communication identity. The device further comprises an application stored in the memory that, when executed by the processor, detects a triggering event and in response to the triggering event selects one of the wireless communication identities stored in the partitions of the memory to be an active communication identity of the mobile communication device, where the mobile communication conducts wireless communication via the cellular radio transceiver based on the active communication identity.

In an embodiment, a method of establishing a wireless communication link by a mobile communication device is disclosed. The method comprises storing a first wireless communication identity in a first partition of a memory of the mobile communication device, wherein the first wireless communication identity comprises a first network access identity, a first list of wireless communication systems to which the device is authorized to attach, a first rule set for prioritizing among the wireless communication systems identified in the first list, and a table of device rules. The method further comprises storing a second wireless communication identity in a second partition of the memory, wherein the second wireless communication identity comprises a second network access identity, a second list of wireless communication systems to which the device is authorized to attach, a second rule set for prioritizing among the wireless communication systems identified in the second list, and a table of device rules, wherein at least the first wireless communication identity is different from the second wireless communication identity, wherein only a single wireless communication identity is active on the device at one time, and wherein the device establishes a wireless communication link based on an active wireless communication identity. The method further comprises receiving a trigger signal and, based on the trigger signal, one of deactivating the first wireless communication identity and activating the second wireless communication identity or deactivating the second wireless communication identity and activating the first wireless communication identity.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
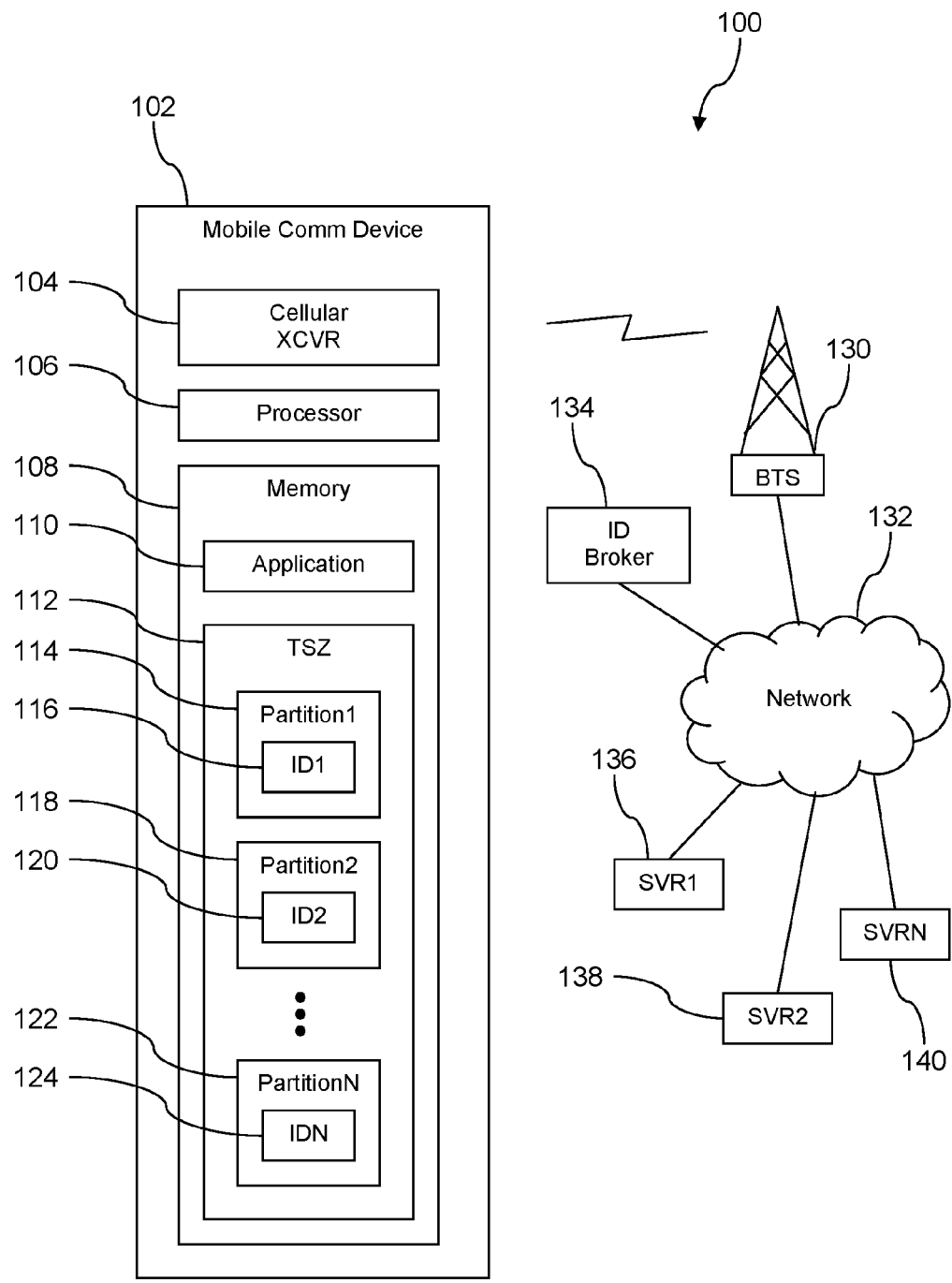
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a wireless communication identity brokering framework. A wireless communication identity is defined further hereinafter, but for a concise overview this identity may be considered to comprise a network access identity and wireless communication operational run-time parameters. This wireless communication identity provides a mobile communication device, such as a mobile phone, not just the authorization credentials to establish a wireless link to a base transceiver station and/or cell tower but also configures the device to engage in wireless communication efficiently. While formerly a single wireless communication identity may have been configured into a mobile communication device, new functionality and advantages may be obtained by configuring the mobile communication device to assume a number of different wireless communication identities.

Wireless communication identities may be activated to promote different user activities. For example, a first wireless communication identity may promote the work activity of the user, for example as an employee of a corporation, and a second wireless communication identity may promote the private life of the user, for example as a husband, father, and/or private person. A third wireless communication identity may promote convenience during a stay at a hotel, for example enabling electronic entry to a hotel room and electronic authorization of purchasing products from a vending machine or a mini-fridge and transferring the cost to the hotel bill. A plurality of different wireless communication identities may promote testing different operational modes of the mobile communication device at an original equipment manufacturer (OEM) factory and/or at a wireless service provider test facility. By changing the wireless communication identity of the mobile communication device, the device can be tested as a different device in some respects.

In an embodiment, at least some of the wireless communication identities are stored in distinct independently accessed portions of memory in the mobile communication device. For example, a trusted security zone may be established having a plurality of sub-zones or partitions, wherein access to each sub-zone or partition is provided based on a sub-key associated with the particular sub-zone or partition, each sub-zone or partition associated with a different and unrelated sub-key. In this case, it may be said that a wireless communication identity stored in a first sub-zone cannot see or interact with a different wireless communication identity stored in a second sub-zone or vice versa. This behavior may provide utility when competitors desire to provide confidential information to the mobile communication device for use in accessing or invoking their services, as the competitors may desire to keep their wireless communication identities confidential from each other.

In an embodiment, two or more of the partitions of the trusted security zone—or distinct independently accessed portions of memory—may be abstracted as providing the functionality of virtual subscriber identity modules (SIMs) such as are used in some mobile phones to provide an identity to the mobile phone and to provide credentials for accessing a radio access network. In an embodiment, the distinctly independently accessed portions or memory may be located on a removable SIM card or on a removable memory card, for example a removable secure data (SD) card. In an embodiment, the distinctly independently accessed portions of memory may be located in a secure element (SE) card of chip in the mobile communication device. It is understood that the wireless communication identities may be stored in the distinct independently accessed portions of memory—in a removable SIM card, in a removable memory card, or in a secure element.

A wireless communication identity broker may provide for building and transmitting wireless communication identities associated with a plurality of different and possibly unrelated entities to the mobile communication device. The identity broker may be a neutral party unassociated with any of the parties that provide wireless communication identities. This neutrality may increase the participation and/or the confidence of competing enterprises. Increased participation by enterprises may improve the utility and value of the wireless communication identity brokering framework.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of nontrusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is described. In an embodiment, the system 100 comprises a mobile communication device 102, a base transceiver station (BTS) 130, a network 132, a wireless identity broker 134 (hereinafter an ID broker 134), a first server 136, a second server 138, and a third server 140. In some contexts, the base transceiver station 130 may be referred to as a cell tower. The network 132 may comprise one or more private communication networks, one or more public communication networks, or a combination thereof. The ID broker 134 and the servers 136, 138, 140 may be implemented as computer systems. Computer systems are described further hereinafter. The mobile communication device 102 may be a mobile phone, a personal digital assistant (PDA), a media player, or a wireless communication enabled portable computer such as a laptop computer, a notebook computer, or a tablet computer.

In an embodiment, the mobile communication device 102 comprises a cellular radio transceiver 104, a processor 106, and a memory 108. It is understood that the processor 106 may be implemented as one processor chip or by a plurality of processor chips. In an embodiment, the processor 106 may comprise a plurality of different processor chips, for example two or more of a microprocessor, a digital signal processor (DSP), a graphics processor unit (GPU), an application specific integrated circuit (ASIC), a field programmable gate array (FPGA), and/or a complex programmable logic device (CPLD). The memory 108 may be implemented as a single memory chip or as a plurality of memory chips. In an embodiment, the memory 108 may comprise a plurality of different types of memory chips. An application 110 is stored in the memory 108 and executed by the processor 106 to store and activate wireless communication identities based on triggering events and/or based on user selection.

In an embodiment, the memory 108 comprises a trusted security zone 112. The trusted security zone 112 may comprise a plurality of trusted security zone partitions, for example a first trusted security zone partition 114, a second trusted security zone partition 118, and a third trusted security zone partition 122. It is understood that the trusted security zone 112 may comprise any number of trusted security zone partitions, either more than or fewer than three trusted security zone partitions. In an embodiment, the trusted security zone may be considered to comprise both an area of the memory 108 (e.g., the trusted security zone 112) and a portion of the processor 106, for example a separate trusted processor or a virtual processor, as described further above. Access to the trusted security zone 112 and/or partitions of the trusted security zone 112 may be mediated or controlled by a trusted application executing in the processor portion of the trusted security zone.

Access to the trusted security zone 112 may be contingent on providing a master trusted security zone key, for example access to configure or add trusted security zone partitions. Access to configured trusted security zone partitions 114, 118, 122 may be authorized by presenting a sub-zone key or a trusted security zone partition key associated with the subject trusted security zone partition. Said in other words, a first sub-zone key may be used to authorize access to the first trusted security zone partition 114, a second sub-zone key may be used to authorize access to the second trusted security zone partition 118, and a third sub-zone key may be used to authorize access to the third trusted security zone partition 122. The first sub-zone key, the second sub-zone key, and the third sub-zone key may each be different from each other.

In an embodiment, the first trusted security zone partition 114 may store a first wireless communication identity 116, the second trusted security zone partition 118 may store a second wireless communication identity 120, and the third trusted security zone partition 122 may store a third wireless communication identity 124. The wireless communication identities 116, 120, 124 may be referred to as the first ID 116, the second ID 120, and the third ID 124. While the description below is written based on an implementation using the trusted security zone 112, it is understood that the teachings of the present disclosure may also be used for wireless communication identities stored in partitions or in portions of memory 108 outside of a trusted security zone.

The cellular radio transceiver 104 may establish a wireless communication link with the base transceiver station 130 according to a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or another cellular wireless communication protocol. While FIG. 1 illustrates a single mobile communication device 102 and a single base transceiver station 130, it is understood that the system 100 may comprise any number of mobile communication devices 102 and any number of base transceiver stations 130. The base transceiver station 130 may provide access to the mobile communication device 102 to the network 132 and there through to the ID broker 134 and the servers 136, 138, 140.

The application 110 executes rules or functions to determine what wireless communication identity is active for conducting wireless communications. The mobile communication device 102 may present a user interface on a display that provides controls for a user to select from among the IDs 116, 120, and 124 which wireless communication identity the application 110 is to make active on the mobile communication device 102. Additionally, the application 110 may monitor operational conditions and/or environmental conditions to determine triggering events and may select an ID 116, 120, 124 to make active based on the triggering events. Triggering events may comprise user inputs, for example a user input in a user interface of the mobile communication device 102 that selects an ID 116, 120, 124.

The application 110 may activate an ID 116, 120, 124 based on a current location of the mobile communication device 102, for example a location that corresponds to a work location or employer location, a private residence location, a hotel location, or other location. The application 110 may provide a user interface promoting user definition of mapping or association of locations to IDs 116, 120, 124. The application 110 may activate an ID 116, 120, 124 based on time and a schedule, for example a work schedule. The application may provide a user interface promoting user definition of the schedule for activating IDs 116, 120, 124. The application 110 may activate an ID 116, 120, 124 based on analyzing a radio signal incident upon the mobile communication device 102, for example a WiFi signal received from a hotel hot spot or a cellular communication signal received from a picocell and/or a micro cellular base station.

When the application 110 activates a different wireless communication identity 116, 120, 124, the application 110 may recalculate or redetermine operational run-time parameters of the mobile communication device 102 based on the ID and store these operational run-time parameters in the memory 108 and/or one or more registers of the processor 106. After recalculating and storing the operational run-time parameters, the application 110 may cause a radio modem of the cellular radio transceiver 104 to reset, thereby bringing the recalculated operational run-time parameters into effect. It is understood that resetting a radio modem may not cause a user partition of the memory 108 to be erased and/or user data to be lost as may sometimes be the case if a full device reset were performed.

While in FIG. 1 the application 110 is illustrated as outside of the trusted security zone 112, in an embodiment, the application 110 may be stored in the trusted security zone 112 and/or invoke functions provided by instructions stored in and/or executing within the trusted security zone 112. In an embodiment, the application 110 may read the information associated with the active wireless communication identity (e.g., read one of the IDs 116, 120, 124, for example by invoking a mediating access function that executes and/or is stored in the trusted security zone 112) and store this information in an area of memory 108 that is used to conduct wireless communications. In an embodiment, the active wireless communication identity may be stored in a plurality of different locations in the memory 108, possibly in non-contiguous areas of the memory 108.

The wireless communication identity 116, 120, 124 comprises information that promotes conducting wireless communications. The wireless communication identity comprises a network access identity. The network access identity may take any form, but in an embodiment the network access identity comprises a code that identifies a country and a code that identifies a wireless network and/or a wireless service provider. For example, in a code division multiple access (CDMA) implementation, the network access identity may comprise a mobile network code (MNC) and a mobile country code (MCC). Alternatively, in a long-term evolution (LTE) implementation, the network access identity may comprise a public land mobile network identity (PLMN ID) that comprises a country code and a network code. The network access identity may be used to authorize access of the mobile communication device 102 to the wireless link provided by the base transceiver station 130 and/or to the network 132.

The wireless communication identity 116, 120, 124 further comprises information that may be used to generate operational run-time parameters for wireless communication. The information may comprise one or more lists of wireless communication networks that the mobile communication device 102 is authorized to attach to, a rule set for prioritizing among the networks identified in the one or more lists, and one or more tables of device rules.

The lists of wireless communication networks that the mobile communication device 102 is authorized to attach to may depend on the wireless communication protocol used by the mobile communication device 102 to establish a wireless link to the base transceiver station 130. Said in another way, the particular lists—the number of lists and the names of lists—of wireless communication networks may be different for mobile communication devices 102 communicating according to different wireless communication protocols. The lists of wireless communication networks may comprise one or more of a PRL, a PLMN list, an OPLMN list, an EHPLMN list, an HPLMN list, an MSPL table, and an MLPL table.

PRL stands for a preferred roaming list. The PRL may comprise information used in network and/or system selection and acquisition. The PRL may organize the information in prioritized order, for example defining what systems and/or service provider identities to scan and in what order to obtain radio access. PLMN stands for public land mobile network. The PLMN list may comprise a list of public land mobile networks and/or other lists, such as an EHPLMN list or an OPLMN list. The HPLMN list is a home PLMN file that may comprise a list of networks or communication systems identified by mobile country code (MCC). EHPLMN stands for an equivalent home PLMN. The EHPLMN list may comprise records of networks or communication systems identified by Mobile Country Code (MCC). OPLMN stands for operator controlled PLMN. The OPLMN list may comprise records of networks or communication systems identified by Mobile Network Code (MNC). MSPL stands for MMSS (multi-mode system selection) System Priority List. The MSPL table may be used with another system selection priority list (e.g., PLMN list, OPLMN list, HPLMN list, EHPLMN list, and the like). MLPL stands for MMSS Location Associated Priority List. The MLPL table may enable scaling a range of entries of a system selection priority list (e.g., PLMN list, OPLMN list, HPLMN list, EHPLMN list, and the like).

These lists and/or tables may be said to implement, define, and/or describe a coverage map. In an embodiment, the MSPL and the MLPL lists or tables may provide geocoding and preference information and may promote mapping between 3GPP and 3GPP2 protocols. The tables of device rules may comprise a band support table and a technology order table. The band support table may identify ranges of radio frequency that the mobile communication device 102 should scan for attaching to the radio access network (RAN), for example to attach to the base transceiver station 130. In an embodiment, the six lists and the two tables may be compiled and/or reformatted to efficiently combine the content as a list or table at run-time on the mobile communication device 102, for example on the event of a modem reset.

In an embodiment, the IDs 116, 120, 124 may comprise addresses of alternative domain name server (DNS) servers, media gateways, ports, and/or routing information. The IDs 116, 120, 124 may share information in common but do differ by at least one parameter value. One or more of the IDs 116, 120, 124 may be stored in a single memory chip or a plurality of memory chips. One or more of the IDs 116, 120, 124 may be stored in different virtual memories or in different segments of memory that are managed as separate virtual memories by an operating system and/or by a virtualization application on the mobile communication device 102. One or more of the IDs 116, 120, 124 may be stored in a removable memory card such as a secure digital (SD) card.

The IDs 116, 120, 124 may be sourced from different sources, for example the first ID 116 may be sourced or provided by the first server 136, the second ID 120 may be sourced by the second server 138, and the third ID 124 may be sourced by the third server 140. Alternatively, two or more IDs may be sourced from a single server. The ID broker 134 may interwork with the severs 136, 138, 140 to mediate the transport of the subject ID 116, 120, 124 to the mobile communication device 102. In an embodiment, the ID broker 134 may arrange transport of the subject ID 116, 120, 124 to the trusted security zone partition 114 of the mobile communication device 102 over a trusted end-to-end communication link. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which was incorporated by reference above. In some contexts, the ID broker 134 may be said to implement multi-identity management brokering as a network service.

Figure 2:
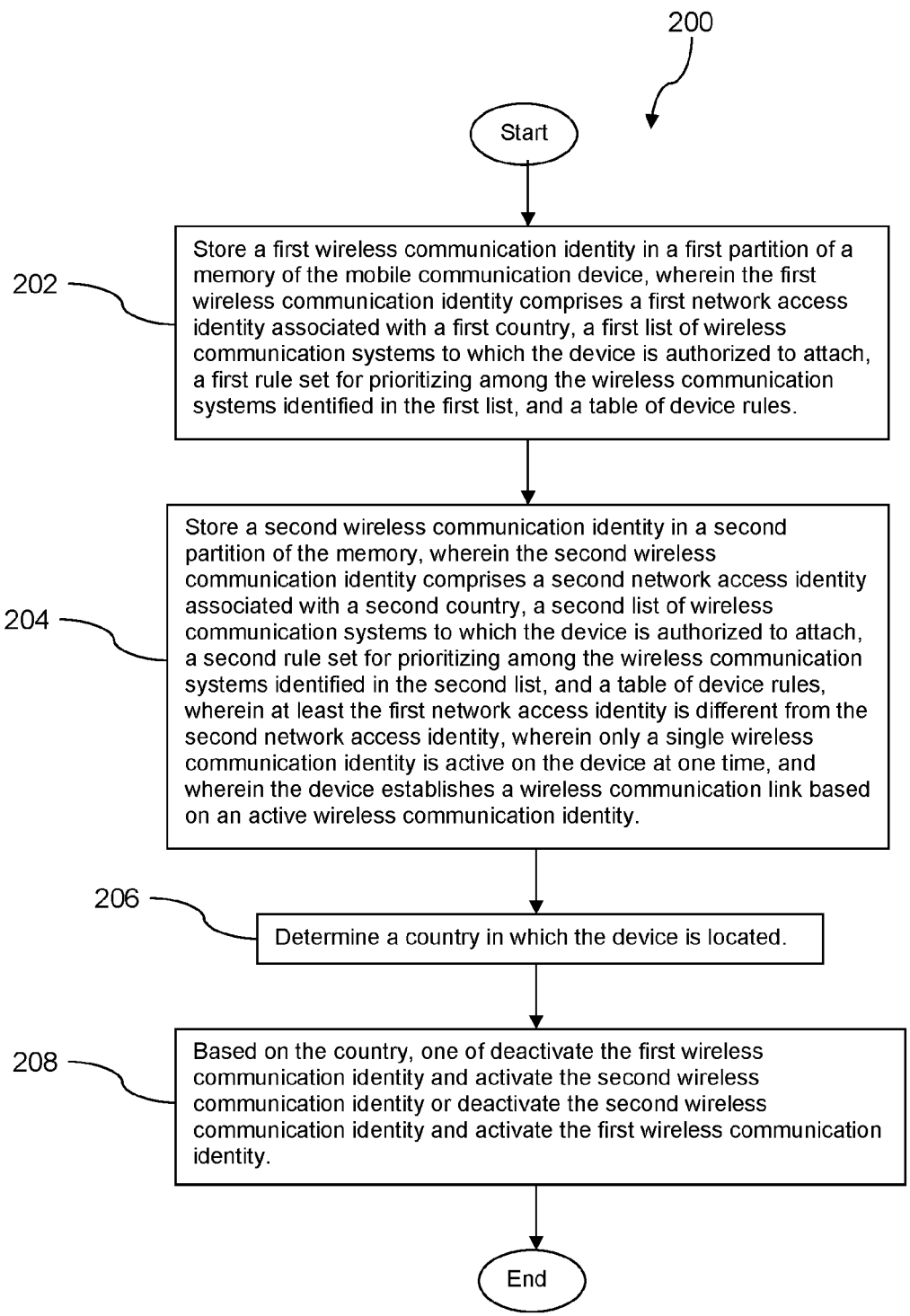
FIG. 2 is a flow chart of a method according to an embodiment of the disclosure.

Turning now to FIG. 2, a method 200 is described. At block 202, a first wireless communication identity is stored in a first partition of a memory of the mobile communication device, wherein the first wireless communication identity comprises a first network access identity associated with a first country, a first list of wireless communication systems to which the device is authorized to attach, a first rule set for prioritizing among the wireless communication systems identified in the first list, and a table of device rules. For example, the first ID 116 is stored in the first trusted security zone partition 114 of the mobile communication device 102.

At block 204, a second wireless communication identity is stored in a second partition of the memory, wherein the second wireless communication identity comprises a second network access identity associated with a second country, a second list of wireless communication systems to which the device is authorized to attach, a second rule set for prioritizing among the wireless communication systems identified in the first list, and a table of device rules. The first network access identity is different from the second network access identity, and only a single wireless communication identity is active on the device at one time. The device is configured to establish a wireless communication link based on an active wireless communication identity. For example, the second ID 120 is stored in the second trusted security zone partition 118 of the mobile communication device 102.

At block 206, a country in which the device is located is determined. At block 208, based on the country, one of deactivate the first wireless communication identity and activate the second wireless communication identity or deactivate the second wireless communication identity and activate the first wireless communication identity.

Figure 3:
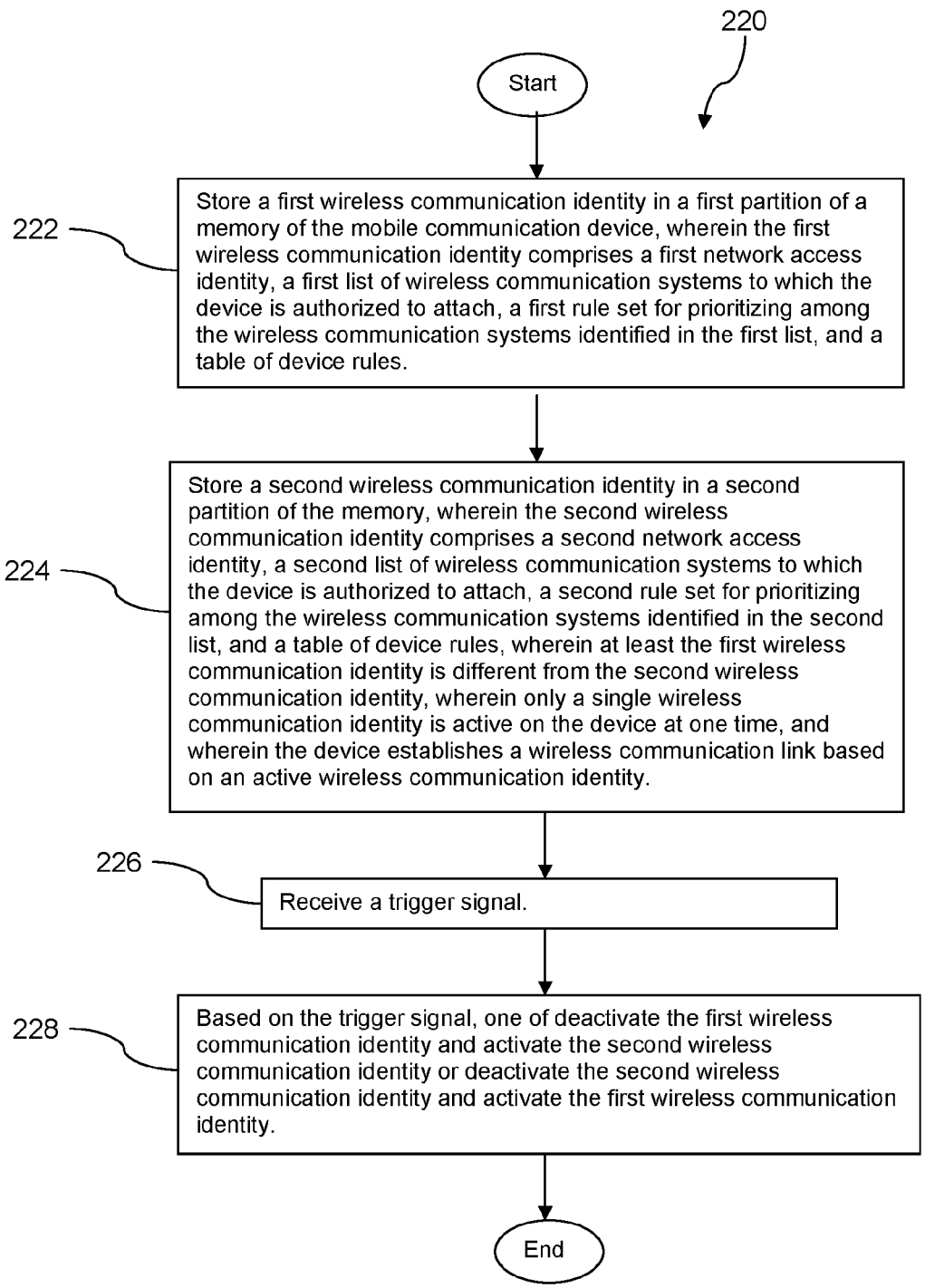
FIG. 3 is a flow chart of another method according to an embodiment of the disclosure.

Turning now to FIG. 3, a method 220 is described. At block 222, a first wireless communication identity is stored in a first partition of a memory of the mobile communication device, wherein the first wireless communication identity comprises a first network access identity, a first list of wireless communication systems to which the device is authorized to attach, a first rule set for prioritizing among the wireless communication systems identified in the first list, and a table of device rules. For example, the first ID 116 is stored in the first trusted security zone partition 114 of the mobile communication device 102.

At block 224, a second wireless communication identity is stored in a second partition of the memory, wherein the second wireless communication identity comprises a second network access identity, a second list of wireless communication systems to which the device is authorized to attach, a second rule set for prioritizing among the wireless communication systems identified in the first list, and a table of device rules. At least the first wireless communication identity is different from the second wireless communication identity, and only a single wireless communication identity is active on the device at one time. The device is configured to establish a wireless communication link based on an active wireless communication identity. For example, the second ID 120 is stored in the second trusted security zone partition 118 of the mobile communication device 102.

At block 226, receive a trigger signal. For example, the application 110 receives a trigger signal transmitted to the mobile communication device 102 from the ID broker 134 via the network 132 and the base transceiver station 130. Alternatively, a trigger signal may be input into a user interface of the mobile communication device 102, for example a user may select an ID 116, 120, 124 presented on a display of the mobile communication device 102. Alternatively, the application 110 or another application executing on the mobile communication device 102 generates the trigger signal itself, based on events experienced by the mobile communication device 102. Events experienced by the mobile communication device 102 may be related to a clock maintained by the mobile communication device 102 passing a scheduled time. Events experienced by the mobile communication device 102 may be related to a changed location of the mobile communication device 102, for example the location of the mobile communication device entering or leaving a circumscribed area, for example a circumscribed area associated with a work location. A circumscribed area may be defined in some contexts as an area within a predefined radius of a geographical coordinate, for example a global positioning system coordinate. A work location may be defined as an area within 400 feet of a central point of the work location, within 800 feet of the central point of the work location, or some other predefined radius. At block 228, based on the trigger signal, one of deactivate the first wireless communication identity and activate the second wireless communication identity or deactivate the second wireless communication identity and activate the first wireless communication identity.

Figure 4:
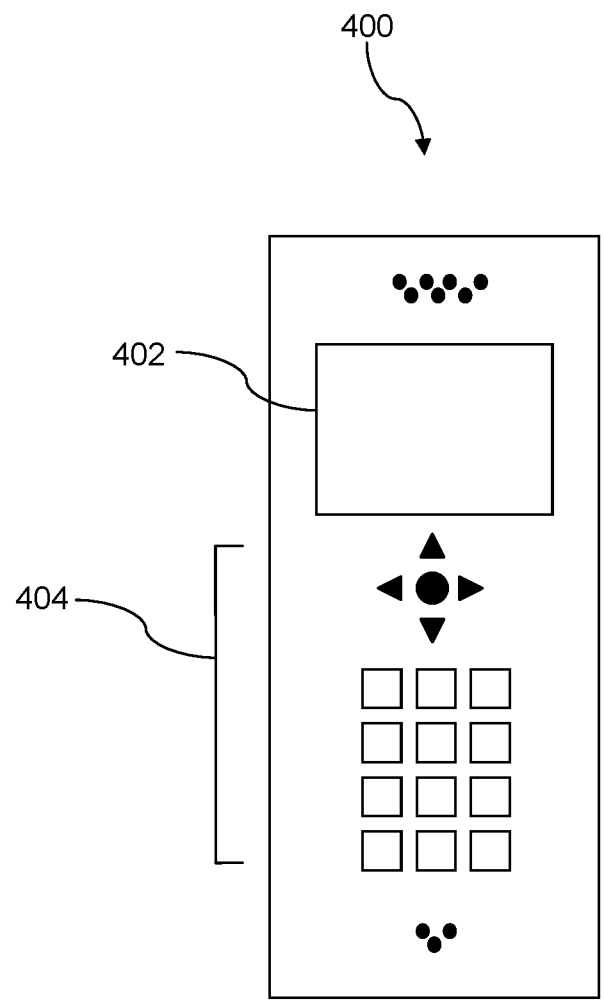
FIG. 4 is an illustration of a communication handset according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
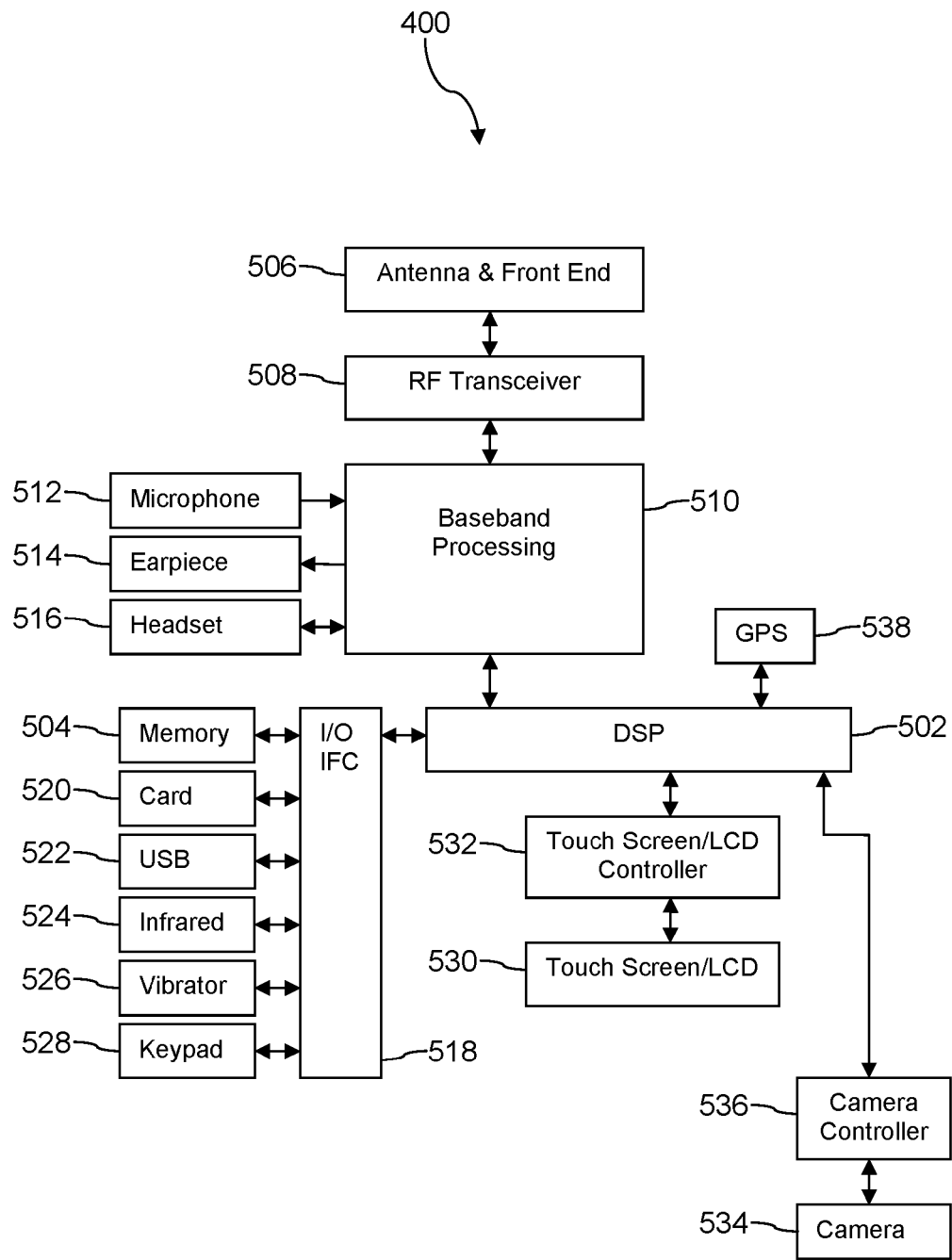
FIG. 5 is a block diagram of a hardware architecture of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
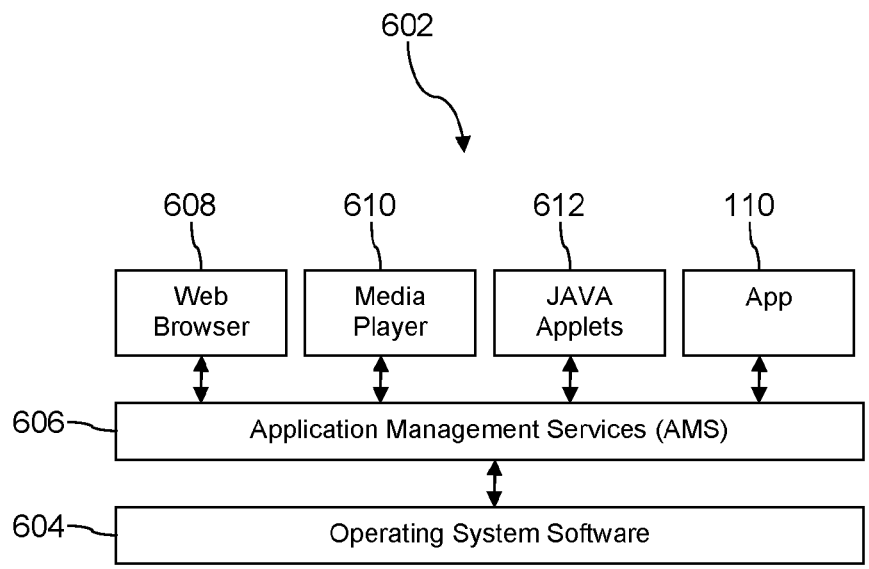
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
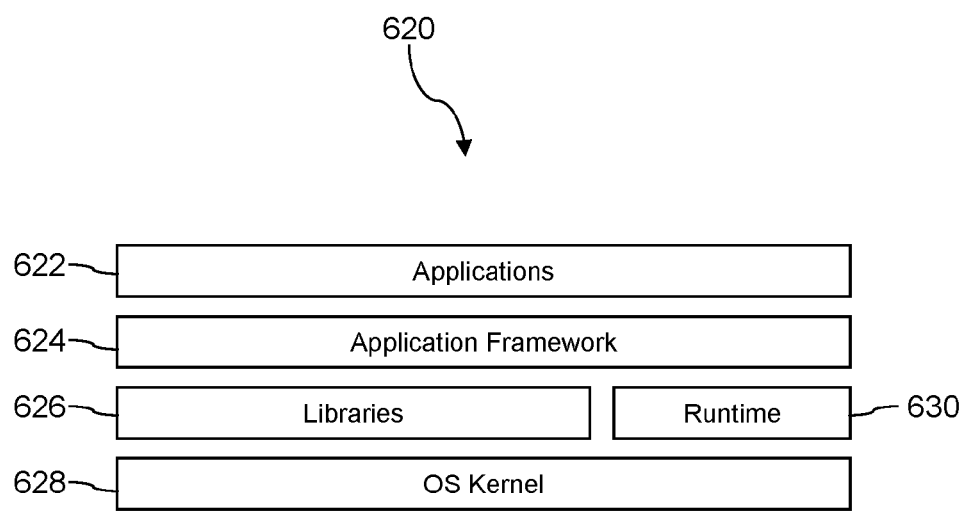
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
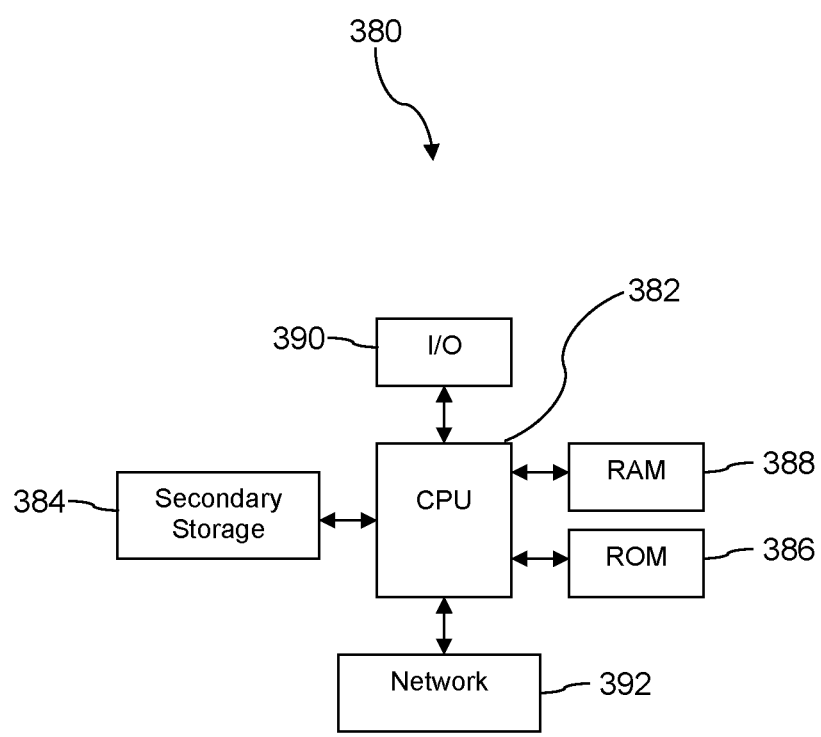
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of establishing a wireless communication link by a mobile communication device, comprising:

receiving a first wireless communication identity from a first server via a wireless identity broker and storing the first wireless communication identity in a first sub-partition of a non-transitory memory of the mobile communication device, wherein the first wireless communication identity comprises a first network access identity associated with a first country, a first list of wireless communication systems to which the mobile communication device is authorized to attach, and a first rule set for prioritizing among the wireless communication systems identified in the first list, and wherein the wireless identity broker mediates transport of the first wireless communication identity to the non-transitory memory;

receiving a second wireless communication identity from a second server via the wireless identity broker and storing the second wireless communication identity in a second sub-partition of the non-transitory memory, wherein the second wireless communication identity comprises a second network access identity associated with a second country, a second list of wireless communication systems to which the mobile communication device is authorized to attach, and a second rule set for prioritizing among the wireless communication systems identified in the second list, wherein at least the first network access identity is different from the second network access identity, and wherein the wireless identity broker mediates transport of the second wireless communication identity to the non-transitory memory;

determining, by an application stored in the non-transitory memory and executable by a processor of the mobile communication device, a country in which the mobile communication device is located; and based on the country, one of:

deactivating, by the application, the first wireless communication identity in the first sub-partition and activating, by the application, the second wireless communication identity in the second sub-partition, or deactivating, by the application, the second wireless communication identity in the second sub-partition and activating, by the application the first wireless communication identity in the first sub-partition, wherein the first sub-partition of the non-transitory memory is accessed based on a first sub-key and the second sub-partition of the non-transitory memory is accessed based on a second sub-key, and wherein the mobile communication device establishes a wireless communication link based on an active wireless communication identity and only a single wireless communication identity is active on the mobile communication device at one time.

2. The method of claim 1, further comprising rebooting the mobile communication device to complete activating either the first wireless communication identity or the second wireless communication identity.

3. The method of claim 1, wherein the first wireless communication identity is provisioned by a first provisioning entity, wherein the second wireless communication identity is provisioned by a second provisioning entity, and wherein the first provisioning entity is different from the second provisioning entity.

4. The method of claim 1, wherein the non-transitory memory is a removable non-transitory memory.

5. The method of claim 1, wherein the non-transitory memory is a trusted security zone, and wherein the trusted security zone provides hardware assisted security.

6. The method of claim 1, wherein the first sub-key is different from the second sub-key.

7. A mobile communication device, comprising:

a cellular radio transceiver;

a non-transitory memory integral with the mobile communication device, wherein the memory is apportioned into a plurality of sub-partitions;

a first wireless communication identity received from a first server via a wireless identity broker and stored in a first sub-partition of the non-transitory memory, wherein a wireless communication identity comprises a network access identity, a list of wireless communication systems to which the mobile communication device is authorized to attach, and a rule set for prioritizing among the wireless communication systems identified in the list, and wherein the wireless identity broker mediates transport of the first wireless communication identity to the non-transitory memory;

a second wireless communication identity received from a second server via the wireless identity broker and stored in a second sub-partition of the non-transitory memory, wherein the second wireless communication identity is different from the first wireless communication identity, and wherein the wireless identity broker mediates transport of the second wireless communication identity to the non-transitory memory;

a processor; and an application stored in the non-transitory memory that, when executed by the processor:

detects a triggering event, and in response to the triggering event, selects the first wireless communication identity stored in the first sub-partition of the non-transitory memory or the second wireless communication identity stored in the second sub-partition of the non-transitory memory to be an active wireless communication identity of the mobile communication device, wherein the first sub-partition of the non-transitory memory is accessed based on a first sub-key and the second sub-partition of the non-transitory memory is accessed based on a second sub-key, and wherein the mobile communication device establishes a wireless communication link via the cellular radio transceiver based on the active wireless communication identity and only a single wireless communication identity is active on the mobile communication device at one time.

8. The mobile communication device of claim 7, wherein the non-transitory memory is a removable non-transitory memory or a trusted security zone.

9. The mobile communication device of claim 7, wherein the triggering event comprises detecting an electronic door scanner signal, a hotel identification wireless beacon signal, or a network identifier signal transmitted by a cell tower.

10. The mobile communication device of claim 7, wherein the application comprises logic to work with a first provisioning system to wirelessly receive the first wireless communication identity and to work with a second provisioning system to wirelessly receive the second wireless communication identity, and wherein the first provisioning system is different from the second provisioning system.

11. The mobile communication device of claim 7, wherein the mobile communication device further comprises:
 a third wireless communication identity stored in a third sub-partition of the non-transitory memory, wherein a wireless communication identity comprises a network access identity, a list of wireless communication systems to which the mobile communication device is authorized to attach, and a rule set for prioritizing among the wireless communication systems identified in the list; and
 a fourth wireless communication identity stored in a fourth sub-partition of the non-transitory memory, wherein the third wireless communication identity is different from the first, second, and fourth wireless communication identities, and wherein the fourth wireless communication identity is different from the first, second, and third wireless communication identities.

12. A method of establishing a wireless communication link by a mobile communication device, comprising:
 receiving a first wireless communication identity from a first server via a wireless identity broker and storing the first wireless communication identity in a first sub-partition of a non-transitory memory of the mobile communication device, wherein the first wireless communication identity comprises a first network access identity, a first list of wireless communication systems to which the mobile communication device is authorized to attach, and a first rule set for prioritizing among the wireless communication systems identified in the first list, and wherein the wireless identity broker mediates transport of the first wireless communication identity to the non-transitory memory;
 receiving a second wireless communication identity from a second server via the wireless identity broker and storing the second wireless communication identity in a second sub-partition of the non-transitory memory, wherein the second wireless communication identity comprises a second network access identity, a second list of wireless communication systems to which the mobile communication device is authorized to attach, and a second rule set for prioritizing among the wireless communication systems identified in the second list, wherein at least the first wireless communication identity is different from the second wireless communication identity, and wherein the wireless identity broker mediates transport of the second wireless communication identity to the non-transitory memory;
 receiving, by an application stored in the non-transitory memory and executable by a processor of the mobile communication device, a trigger signal; and
 based on the trigger signal, one of:
  deactivating, by the application, the first wireless communication identity in the first sub-partition and activating, by the application, the second wireless communication identity in the second sub-partition, or
  deactivating, by the application, the second wireless communication identity in the second sub-partition and activating, by the application, the first wireless communication identity in the first sub-partition, wherein the first sub-partition of the non-transitory memory is accessed based on a first sub-key and the second sub-partition of the non-transitory memory is accessed based on a second sub-key, and wherein the mobile communication device establishes a wireless communication link based on an active wireless communication identity and only a single wireless communication identity is active on the mobile communication device at one time.

13. The method of claim 12, wherein the first wireless communication identity corresponds to a business usage identity and the second wireless communication identity corresponds to a personal usage identity.

14. The method of claim 13, wherein the first wireless communication identity is associated with a first wireless communication subscription account and the second wireless communication identity is associated with a second wireless communication subscription account.

15. The method of claim 12, wherein the first wireless communication identity is associated with a production use environment and the second wireless communication identity is associated with a first test environment.

16. The method of claim 15, further comprising storing a third wireless communication identity in a third sub-partition of the non-transitory memory of the mobile communication device, wherein the third wireless communication identity comprises a third network access identity, a third list of wireless communication systems to which the mobile communication device is authorized to attach, and a third rule set for prioritizing among the wireless communication systems identified in the third list, and wherein the third wireless communication identity is associated with a second test environment.

17. The method of claim 12, wherein the list of wireless communication systems to which the mobile communication device is authorized to attach comprises a coverage map.

18. The method of claim 17, wherein the coverage map comprises one or more of an MLPL file, an MSPL file, an EQPRL file, an OPLMN file, an EHPLMN file, and an HPLMN file.

19. The method of claim 17, wherein the coverage map file comprises a compilation of an MLPL file, an MSPL file, an EQPRL file, an OPLMN file, an EHPLMN file, and an HPLMN file.

20. The method of claim 7, wherein the first sub-key is different from the second sub-key, and wherein the first wireless communication identity in the first sub-partition cannot interact with the second wireless communication identity in the second sub-partition.

* * * * *